United States Patent [19]

Nagamura et al.

[11] Patent Number: 5,441,719
[45] Date of Patent: Aug. 15, 1995

[54] ULTRA-HIGH PURITY NITROGEN GENERATING METHOD

[75] Inventors: Takashi Nagamura; Takao Yamamoto; Shinji Tomita, all of Hyogo, Japan

[73] Assignee: American Air Liquide, Walnut Creek, Calif.

[21] Appl. No.: 102,669

[22] Filed: Aug. 5, 1993

[30] Foreign Application Priority Data

Aug. 6, 1992 [JP] Japan .................. 4-229468

[51] Int. Cl.$^6$ ............................................ C01B 21/04
[52] U.S. Cl. ........................................ 423/351; 62/24; 422/190
[58] Field of Search ............................. 62/24; 423/351

[56] References Cited

U.S. PATENT DOCUMENTS

| | | | |
|---|---|---|---|
| 3,240,554 | 3/1966 | Angerhofer | 423/351 |
| 3,388,973 | 6/1968 | Marquardt et al. | 423/351 |
| 4,960,579 | 10/1990 | Campbell | 423/351 |
| 5,077,029 | 12/1991 | Schaub | 423/351 |
| 5,170,630 | 12/1992 | Stern | 62/24 |
| 5,238,670 | 8/1993 | Louise et al. | 423/351 |

FOREIGN PATENT DOCUMENTS

| | | | |
|---|---|---|---|
| 735366 | 5/1966 | Canada | 423/351 |
| 1241 | 1/1965 | Japan | 423/351 |
| 2129115 | 5/1984 | United Kingdom | 423/351 |

*Primary Examiner*—Wayne Langel
*Attorney, Agent, or Firm*—Robert D. Touslee

[57] ABSTRACT

An ultra-high purity nitrogen generating method is disclosed which comprises: oxidizing feed nitrogen gas containing oxygen added therein so that carbon monoxide in the feed nitrogen gas is converted for removal to carbon dioxide and hydrogen to water; then introducing the feed nitrogen gas to a nitrogen rectification column, and taking out liquid nitrogen containing unreacted oxygen from the lower portion thereof; adding nitrogen gas obtained by gas liquid separation in a gas-liquid separator and containing the unreacted oxygen gas to the feed nitrogen gas, and using a resulting mixture in circulation; taking out high purity nitrogen gas from the top portion of the nitrogen rectification column, condensing in a condenser the taken out high purity nitrogen gas by liquid nitrogen from the gas-liquid separator, refluxing the condensed nitrogen gas to the upper portion of the nitrogen rectification column as a reflux liquid, and taking out ultra-high purity nitrogen gas or ultra-high purity liquid nitrogen. An ultra-high purity nitrogen generator therefor is also provided.

7 Claims, 1 Drawing Sheet

ULTRA-HIGH PURITY NITROGEN GENERATING METHOD

FIELD OF THE INVENTION

The present invention relates to an ultra-high purity nitrogen generating method and a generator therefor, and especially to an ultra-high purity nitrogen generating method and a generator therefor, which generate ultra-high purity nitrogen suitable for the manufacture of submicron LSI.

BACKGROUND OF THE INVENTION

In case nitrogen is produced from air by an air separation unit, for example, as disclosed in the official gazette of Japanese Patent Application Laid-open No. 225,568/1986, the following method has been hitherto adopted. Namely, after impurities which become catalyst poisons for an oxidation catalyst such as sulfur oxides ($SO_x$) and hydrogen sulfide ($H_2S$) are insufficiently removed from feed air, the feed air is fed to an oxidation catalyst column, where carbon monoxide and hydrogen are oxidized and then removed therefrom by adsorption, and nitrogen gas and oxygen gas are introduced to a nitrogen rectification column, and as a result, a part of nitrogen is taken out as a product and oxygen is used together with the remaining part of nitrogen except for the product as a regenerating gas for an adsorption column and then discharged as an impure gas.

The official gazette of Japanese Patent Application Laid-open No. 177/1992 discloses a nitrogen purifying method and a purifier therefor, in which $H_2$ is removed by rectification, and the official gazette of Japanese Patent Application Laid-open No. 9,587/1992 discloses also a nitrogen purifying method and a purifier therefor, in which $H_2$ is separated by rectification, after CO is removed by low temperature adsorption. Furthermore, in the official gazette of Japanese Patent Application Laid-open No. 86,474/1992, an excess amount of oxygen added to oxidize CO and $H_2$ is exhausted as a high boiling point component.

However, nitrogen obtained by the aforementioned air separating methods in the prior art contains impurities such as $O_2$, $H_2$, CO, $CO_2$, $C_nH_m$ and $H_2O$ which are undesirable in the manufacture of submicron LSI, in an order of several ppb.

In the methods, in which CO and $H_2$ are removed through their reactions at a pretreatment step, as disclosed in each of the aforementioned official gazettes, there is such a problem that the activity of a catalyst is remarkably lowered by catalyst poisons such as $SO_x$ and $H_2S$ in the atmosphere, and there are further such problems that, in the removal of CO through rectification, the recovery efficiency is decreased and a large number of rectifying trays are required, because the vapor pressure of CO is near to that of nitrogen.

The present invention is intended to eliminate the aforementioned drawbacks.

SUMMARY OF THE INVENTION

The ultra-high purity nitrogen generating method according to the present invention comprises:
  a step of adding oxygen to feed nitrogen gas containing carbon monoxide and hydrogen, left after removal of sulfides, increasing the pressure and temperature of a resulting mixture, and subjecting it to an oxidation with a catalyst to convert the carbon monoxide to carbon dioxide and the hydrogen to water;
  a step of then cooling, drying and decarboxylating the mixture to remove the carbon dioxide and water, and introducing the remaining unreacted oxygen and nitrogen gas to a nitrogen rectification column;
  a step of supplying cold to one of equipments in a cold box;
  a step of taking out liquid nitrogen containing the unreacted oxygen from the lower portion of the nitrogen rectification column, and separating the liquid nitrogen to gas and liquid by a gas-liquid separator, after it is expanded by an expansion valve;
  a step of adding nitrogen gas containing the unreacted oxygen gas in the gas-liquid separator to the feed nitrogen gas and using a resulting mixture in circulation, and bringing high purity nitrogen gas obtained from the top portion of the nitrogen rectification column into heat exchange with low purity liquid nitrogen from the gas-liquid separator by way of a condenser so that it is liquefied, and returning the liquefied nitrogen gas to the upper portion of the nitrogen rectification column, wherein a part thereof is refluxed as a reflux liquid and the remaining part thereof is taken out as ultra-high purity nitrogen gas obtained by rectification from a rectifying tray several stages below the uppermost portion of the rectifying trays of the nitrogen rectification column; and
  a step of discharging uncondensed gas in the high purity nitrogen gas which has been not liquefied in the condenser from the lower portion of the condenser.

The ultra-high purity nitrogen generating method according to the present invention comprises:
  a step of supplying feed liquid nitrogen containing carbon monoxide and hydrogen, left after removal of sulfides, to a gas-liquid separator;
  a step of feeding the feed liquid nitrogen from the gas-liquid separator to a condenser where it is gasified;
  a step of adding a required amount of oxygen to the obtained feed nitrogen gas, and increasing the pressure and temperature of a resulting mixture;
  a step of then subjecting the mixture to an oxidation to convert the carbon monoxide to carbon dioxide and the hydrogen to water;
  a step of then cooling, drying and decarboxylating the mixture to remove the carbon dioxide and water, and introducing the remaining unreacted oxygen and nitrogen gas to a nitrogen rectification column;
  a step of taking out liquid nitrogen containing the unreacted oxygen from the lower portion of the nitrogen rectification column, and separating the liquid nitrogen to gas and liquid by the gas-liquid separator, after it is expanded by an expansion valve;
  a step of adding nitrogen gas containing the unreacted oxygen gas in the gas-liquid separator to the feed nitrogen gas and using a resulting mixture in circulation, and returning high purity nitrogen gas obtained from the top portion of the nitrogen rectification column to the upper portion of the nitrogen rectifying column by way of the condenser, wherein a part thereof is refluxed as a reflux liquid and the remaining part thereof is taken out as ultra-high purity liquid nitrogen obtained by rectification from a rectifying tray several stages below the uppermost portion of the rectifying trays of the nitrogen rectification column; and a step of discharging uncondensed gas in the high purity nitrogen gas which has been not liquefied in the condenser form the lower portion of the condenser.

The ultra-high purity nitrogen generator according to the present invention, which comprises:

a compressor for compressing feed nitrogen gas containing carbon monoxide, hydrogen and oxygen, left after removal of sulfides;

an oxidation catalyst packed column for oxidizing the gas compressed by the compressor;

a means for removing carbon dioxide and water produced by the oxidation;

a nitrogen rectification column for rectifying the remaining unreacted oxygen and nitrogen gas introduced therein;

a gas-liquid separator for separating liquid nitrogen taken out of the lower portion of the nitrogen rectification column and containing the unreacted oxygen to gas and liquid;

a circulation means for adding nitrogen gas containing the unreacted oxygen gas in the gas-liquid separator to the feed nitrogen gas;

a nitrogen condenser for condensing high purity nitrogen gas obtained from the top portion of the nitrogen rectification column by low purity liquid nitrogen obtained from the gas-liquid separator;

a means for returning high purity liquid nitrogen obtained from the nitrogen condenser to the upper portion of the nitrogen rectification column, wherein a part thereof is refluxed as a reflux liquid and the remaining part thereof is taken out as an ultra-high purity nitrogen product;

a means for discharging uncondensed gas in the high purity nitrogen gas which has been not liquefied in the condenser form the lower portion of the condenser; and a heat exchanger for bringing the nitrogen gas introduced to the nitrogen rectification column, the nitrogen gas for circulation obtained from the gas-liquid separator and containing the unreacted oxygen gas and the ultra-high purity nitrogen product into heat exchange with one another.

DETAILED DESCRIPTION OF PREFERRED EMBODIMENTS

Figure 1:
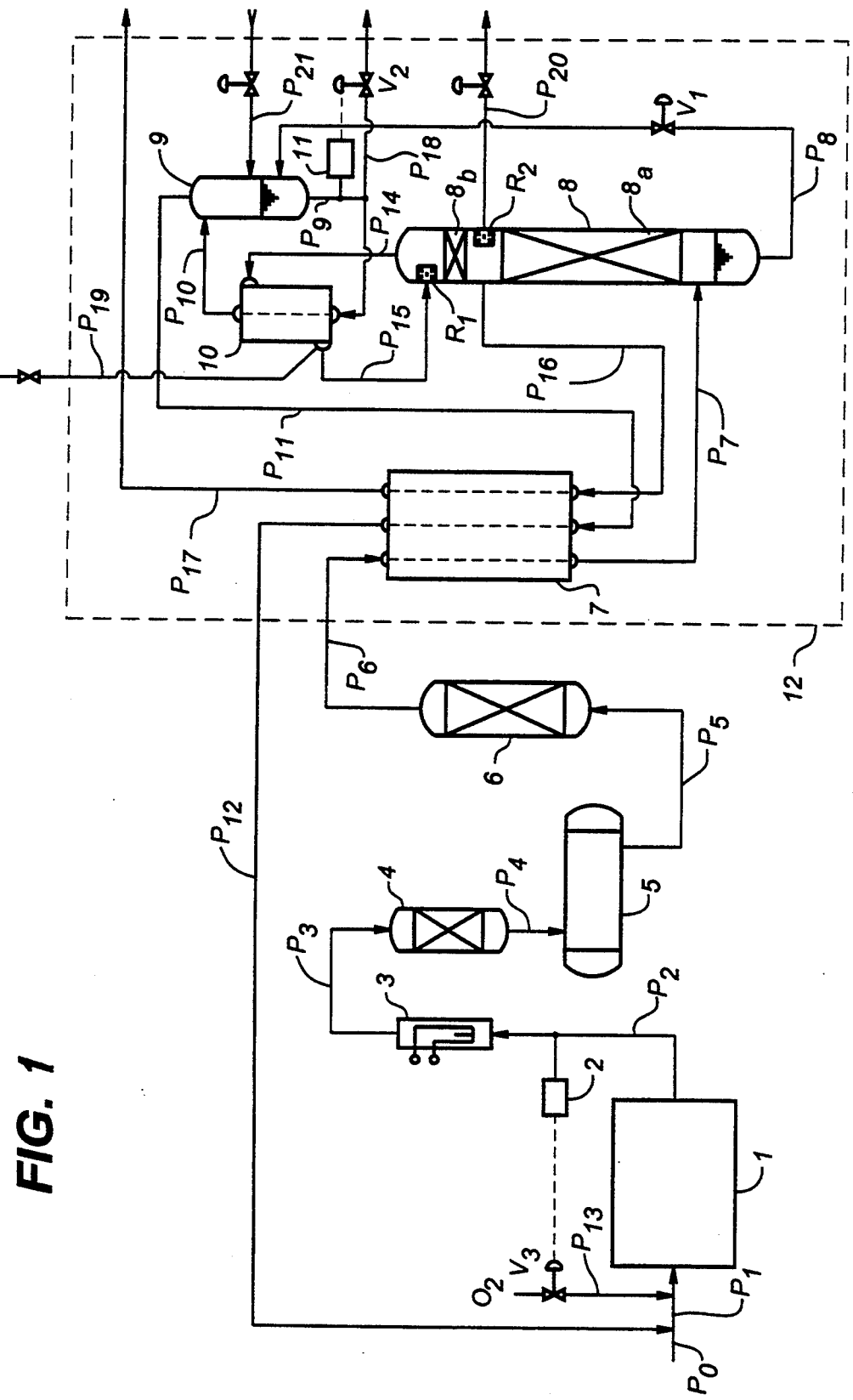
FIG. 1 is a flow diagram of the ultra-high purity nitrogen generating method and generator therefor according to the present invention.

Referring to the drawings, the embodiments of the present invention will be described.

In the present invention, as shown in the flow diagram of FIG. 1, low purity nitrogen gas containing carbon monoxide (CO) and hydrogen ($H_2$), left after the removal of sulfides (not illustrated), is fed to a pipe $P_1$ through a pipe $P_0$, and introduced together with oxygen ($O_2$) for reaction use into a nitrogen compressor 1 by way of the pipe $P_1$ as feed gas, where it is compressed to about 7.5 kg/cm². The feed gas which has been risen in pressure and increased in temperature as a result of this compression is led to a pipe $P_2$, and the oxygen content of the nitrogen gas within the pipe $P_2$ is analyzed by an oxygen analyzer 2 placed in the pipe $P_2$. By regulating an automatic valve $V_3$ interlocking with the oxygen analyzer 2 so that the oxygen content becomes about 1~21%, oxygen is added into the pipe $P_1$ from an oxygen source (not shown) through a pipe $P_{13}$, and the feed gas in the pipe $P_2$ is optionally heated by a heater 3. The feed gas is passed through a packed column 4 filled with an oxidation catalyst through a pipe $P_3$, wherein carbon monoxide and hydrogen in the nitrogen gas are respectively oxidized so as to be converted to carbon dioxide ($CO_2$) and water ($H_2O$), as represented by the following equations:

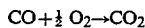

$$CO + \tfrac{1}{2} O_2 \rightarrow CO_2$$

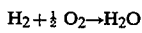

$$H_2 + \tfrac{1}{2} O_2 \rightarrow H_2O$$

Then, the feed gas is led to a pipe $P_4$.

The feed gas led to the pipe $P_4$ is cooled down by a cooler 5, led to a drier 6 by way of a pipe $P_5$, where carbon dioxide and water are removed therefrom, and the feed gas is led to a main heat exchanger 7 by way of a pipe $P_6$, where it is exchanged in heat with nitrogen gas for circulation use containing unreacted oxygen gas, which will be hereinafter described, and an ultra-high purity nitrogen gas product, which will be also hereinafter described, so as to be cooled down nearly to its liquefying point. Then, the cooled feed gas is introduced to the lower portion of a nitrogen rectification column 8 by way of a pipe $P_7$, where it is rectified in the rectifying portions 8a, 8b of the nitrogen rectification column 8 by a reflux liquid which will be hereinafter described.

At that time, nitrogen gas containing gases whose boiling points are lower than that of nitrogen gas, is rectified as it passes and rises through the rectifying portions 8a, 8b. This nitrogen gas is introduced to a nitrogen condenser 10 by way of a pipe $P_{14}$, where it is exchanged in heat with liquid nitrogen containing oxygen, which will be hereinafter described, so as to be cooled down and liquefied. The liquefied nitrogen is returned to a reservoir portion $R_1$ of the nitrogen rectification column 8 through a pipe $P_{15}$, and un-condensed gas which has been not liquefied in the nitrogen condenser 10 is taken out of the lower portion of the nitrogen condenser 10 through a pipe $P_{19}$ and discharged to the atmosphere.

The liquid nitrogen containing unreacted oxygen, which is formed from the feed gas introduced in the nitrogen rectification column 8 by way of the pipe $P_7$, is reservoired in the bottom portion thereof after the rectification, and this liquid nitrogen is then led to an expansion valve $V_1$ through a pipe $P_8$, where it is freely expanded, and the expanded liquid nitrogen is separated to gas and liquid in a gas-liquid separator 9. The liquid nitrogen containing oxygen is introduced from the bottom portion of said gas-liquid separator 9 to the nitrogen condenser 10 by way of a pipe $P_9$, where it is exchanged in heat with nitrogen gas coming from the pipe $P_{14}$ so as to be gasified. The resulting nitrogen gas is returned to the gas-liquid separator 9 by way of a pipe $P_{10}$, and introduced to the main heat exchanger 7 together with low purity nitrogen gas which has been already introduced to the gas-liquid separator 9 through the pipe $P_8$, by way of a pipe $P_{11}$, where they are exchanged in heat with the feed gas coming from the pipe $P_6$ so as to have normal temperature, and returned to the pipe $P_1$ though a pipe $P_{12}$.

A part of the high purity liquid nitrogen returned to the reservoir portion $R_1$ of the nitrogen rectification column 8 by way of the pipe $P_{15}$, after the uncondensed gas which has been not liquefied in the nitrogen condenser 10 is separated, is taken out as the said reflux liquid, and the remaining part thereof is taken out under a rectifying tray several stages below the reservoir portion $R_1$ by way of a pipe $P_{16}$ as low temperature ultra-high purity nitrogen gas in which the amounts of the low boiling point impurities are further decreased. The low temperature ultra-high purity nitrogen gas is warmed by heat of the feed gas from the pipe $P_6$ which flows in countercurrent therewith in the main heat exchanger 7 so as to have normal temperature, and the warmed nitrogen gas is then taken out through a pipe $P_{17}$ as an ultra-high purity nitrogen gas product having a pressure of 7 kg/cm$^2$G.

A portion 12 surrounded by a dotted line in FIG. 1 represents a cold box, where equipments such as the main heat exchanger 7, nitrogen rectification column 8, gas-liquid separator 9 and nitrogen condenser 10 are accommodated in the inside of the cold box. Although this cold box 12 is thermally insulated because it is a low temperature portion, the liquid nitrogen, whose amount is about 1/100 of the cyclic gas fed from the pipe $P_1$ to the compressor, is fed into the gas-liquid separator 9 by way of a pipe $P_{21}$ in order to supplement a shortage of cold.

When it is necessitated to obtain a liquid product, the supply of the feed gas from the pipe $P_0$ and the delivery of the ultra-high purity nitrogen gas product from the pipe $P_{16}$ are stopped, and feed liquid nitrogen is fed from the pipe $P_{21}$ to the gas-liquid separator 9. In this case, the feed liquid nitrogen is gasified in the condenser 10 and fed to the compressor 1 by way of the pipes $P_{11}$, $P_{12}$ and $P_1$ as feed nitrogen gas. This feed nitrogen gas is analyzed by the oxygen analyzer 2 as it passes through the pipe $P_2$, thereby detecting its oxygen content, and oxygen is added thereto from an oxygen source through the pipe $P_{13}$, because it does not contain oxygen in an amount necessary for reaction.

In this embodiment, a large amount of the high purity nitrogen gas obtained from the top portion of the nitrogen rectification column 8 by way of the pipe $P_{14}$ is liquefied by a sufficient amount of the feed liquid nitrogen added to the gas-liquid separator 9, in the condenser 10. By refluxing this liquid to the reservoir portion $R_1$ of the nitrogen rectification column 8 by way of the pipe $P_{15}$, accordingly, a part thereof is used as a reflux liquid necessary for the rectification in the nitrogen rectification column 8, and the remaining part thereof can be taken out of a reservoir portion $R_2$ under a rectifying tray several stages below the reservoir portion $R_1$ in the nitrogen rectification column 8, by way of a pipe $P_{20}$ as an ultra-high purity liquid nitrogen product.

One drier 6 is installed in FIG. 1, but two driers may be optionally installed. Two driers may be alternately used, and namely, one drier is being used while the other drier is regenerated by the feed nitrogen gas from the pipe $P_0$ or the cyclic gas from the pipe $P_{12}$.

The impurity compositions of these products, i.e. the ultra-high purity nitrogen gas and ultra-high purity liquid nitrogen, are shown in Table 1.

TABLE 1

| Oxygen | $O_2$ | <0.1 PPb |

TABLE 1-continued

| Hydrogen | $H_2$ | <1 PPb |
|---|---|---|
| Carbon Monoxide | CO | <0.1 PPb |
| Carbon Dioxide | $CO_2$ | <0.1 PPb |
| Hydrocarbons in total | CnHm | <0.1 PPb |
| Moisture | $H_2O$ | <0.1 PPb |

In the bottom portion of the gas-liquid separator 9, small amount components whose boiling points are higher than that of nitrogen are concentrated. An analyzer 11 is therefore set on the pipe $P_9$ leading from the bottom portion of the gas-liquid separator 9 to measure impurities of said small amount components, and an automatic valve $V_2$ interlocking with the analyzer 11 is opened in accordance with the measurement values to discharge the small amount components including said impurities to the atmosphere, whereby the high boiling point components are prevented from being mixed into the low purity nitrogen gas returned to the gas-liquid separator 9 through the pipe $P_{10}$.

In the ultra-high purity nitrogen generating method and generator therefor according to the present invention, as mentioned above, clean low purity nitrogen gas free from catalyst poisoning matters is subjected to a catalytic reaction, thereby converting CO and $H_2$ difficult to remove to $CO_2$ and $H_2O$ easy to remove and excess $O_2$. Accordingly, there are such large benefits that the recovery efficiency of nitrogen can be increased to 99% or more, the number of the rectifying trays in the nitrogen rectification column 8 can be reduced, and at the same time, the activity of a catalyst can be maintained for a long period of time, and further ultra-high purity nitrogen can be manufactured at the minimum amount of oxygen added.

What is claimed is:

1. An ultra-high purity nitrogen generating method comprising the steps of:

adding oxygen to feed nitrogen gas containing carbon monoxide and hydrogen to form a resulting gas mixture;

increasing the pressure and temperature of the resulting mixture;

contacting the resulting gas mixture with oxidizing catalyst under oxidizing conditions to convert a major portion of the carbon monoxide to carbon dioxide and a major portion of the hydrogen to water to form a converted gas mixture;

cooling and drying at least a portion of the converted gas mixture to remove the major amount of the carbon dioxide and water and form a remaining gas mixture comprising unreacted oxygen and nitrogen gas;

introducing the remaining gas mixture to a nitrogen rectification column under low temperature conditions;

withdrawing liquid nitrogen comprising at least a portion of the unreacted oxygen from the lower portion of the nitrogen rectification column;

expanding at least a portion of the liquid nitrogen and separating the nitrogen to form gas comprising nitrogen and unreacted oxygen and liquid in a gas-liquid separator;

recycling the gas comprising nitrogen and unreacted oxygen gas in the gas-liquid separator to the feed nitrogen gas;

bringing high purity nitrogen gas obtained from the top portion of the nitrogen rectification column into heat exchange with low purity liquid nitrogen from the gas-liquid separator by way of a condenser so that at least a portion of the high purity nitrogen gas is liquefied;

returning the liquefied nitrogen gas to the upper portion of the nitrogen rectification column, wherein a part thereof is refluxed as a reflux liquid and the remaining part thereof is taken out as ultra-high purity nitrogen gas obtained by rectification from a rectifying tray several stages below the uppermost portion of the rectifying trays of the nitrogen rectification column; and discharging uncondensed gas in the high purity nitrogen gas which has been not liquefied in the condenser from the condenser.

2. The method as recited in claim 1 wherein the feed nitrogen gas comprising carbon monoxide and hydrogen has been subjected to a sulfur oxide removal process.

3. The ultra-high purity nitrogen generating method, as set forth in claim 1, further comprising the steps of:

measuring the concentration of impurities having higher boiling points than that of oxygen in the low purity liquid nitrogen reservoired in the gas-liquid separator; and, selectively venting liquid nitrogen containing the impurities to the atmosphere based upon the measured concentration of impurities.

4. The ultra-high purity nitrogen generating method, as set forth in claim 2, further comprising the steps of:

measuring, by an analyzer, the concentration of impurities which have higher boiling points than that of oxygen in the low purity liquid nitrogen in the gas-liquid separator; and, selectively venting at least a portion of the low purity liquid nitrogen comprising impurities to the atmosphere based upon the measured concentration of impurities.

5. The ultra-high purity nitrogen generating method, as set forth in claim 1, further comprising the step of:

supplying liquid nitrogen to the gas-liquid separator in a cold box to maintain a lowered temperature.

6. An ultra-high purity nitrogen generating method comprising the steps of:

supplying feed liquid nitrogen containing carbon monoxide and hydrogen to a gas-liquid separator;

feeding the feed liquid nitrogen from the gas-liquid separator to a condenser where it is gasified;

adding oxygen to the obtained feed nitrogen gas, and increasing the pressure and temperature of a resulting mixture;

subjecting the mixture to an oxidation to convert the carbon monoxide to carbon dioxide and the hydrogen to water;

cooling, drying and decarboxylating the mixture to remove the carbon dioxide and water, and introducing the remaining unreacted oxygen and nitrogen gas to a nitrogen rectification column;

taking out liquid nitrogen containing the unreacted oxygen from the lower portion of the nitrogen rectification column, and separating the liquid nitrogen to gas and a low purity liquid by the gas-liquid separator, after it is expanded by an expansion valve;

adding nitrogen gas containing the unreacted oxygen gas in the gas-liquid separator to the feed nitrogen gas and using a resulting mixture in circulation, and returning high purity nitrogen gas obtained from the top portion of the nitrogen rectification column to the upper portion of the nitrogen rectification column by way of the condenser, wherein a part thereof is refluxed as a reflux liquid and the remaining part thereof is taken out as ultra-high purity liquid nitrogen obtained by rectification from a rectifying tray several stages below the uppermost portion of the rectifying trays of the nitrogen rectification column; and discharging uncondensed gas in the high purity nitrogen gas which has been not liquefied in the condenser from the lower portion of the condenser.

7. The method as recited in claim 6 wherein the feed nitrogen gas comprising carbon monoxide and hydrogen has been subjected to a sulfur oxide removal process.

* * * * *